United States Patent [19]
Kelton

[11] 3,776,553
[45] Dec. 4, 1973

[54] ANIMATED MECHANICAL STEER HAVING SPRING BIASED HEAD

[76] Inventor: Robert L. Kelton, 1895 Hayden Ln., Tempe, Ariz. 85281

[22] Filed: Dec. 29, 1972

[21] Appl. No.: 319,485

[52] U.S. Cl.................. 273/105.2, 46/164, 46/119, 35/29 R
[51] Int. Cl.............................................. A63b 71/02
[58] Field of Search............ 273/104, 105.2, 102 R; 35/29 R; 119/29; 46/128, 119, 164

[56] References Cited
UNITED STATES PATENTS

| 3,303,821 | 2/1967 | Harris | 273/105.2 |
| 3,066,939 | 12/1962 | Sprout | 273/104 |
| 2,364,699 | 12/1944 | Eastman | 273/105.2 |
| 2,819,900 | 1/1958 | Brackett | 273/105.2 |
| 3,324,832 | 6/1967 | McCain | 273/105.2 |
| 3,406,969 | 10/1968 | Tisdell | 273/105.2 |
| 3,711,098 | 1/1973 | McCord | 273/105.2 |

Primary Examiner—Anton O. Oechsle
Assistant Examiner—Marvin Siskind
Attorney—Warren F. B. Lindsley

[57] ABSTRACT

An animated mechanically operated steer which simulates the appearance and natural movements of a live animal used for practicing the art of cattle roping from horseback and to train a horse to follow the moving steer at the proper speed and distance for roping or lassoing purposes. An arm rotatably secured to a pedestal is also secured to the steer and drives the steer. The back legs of the steer move in an arcuate path to simulate a live animal. The head is pivotally secured to the frame and comprises a pair of horns mounted thereon. A pair of springs are mounted on the frame to opposite sides of the head to hold the head in a vertical position. Thereby, when the head is lassoed by a rope, it moves in an arcuate manner to dislodge the rope in a live steer simulated manner.

6 Claims, 7 Drawing Figures

PATENTED DEC 4 1973
3,776,553
SHEET 1 OF 2
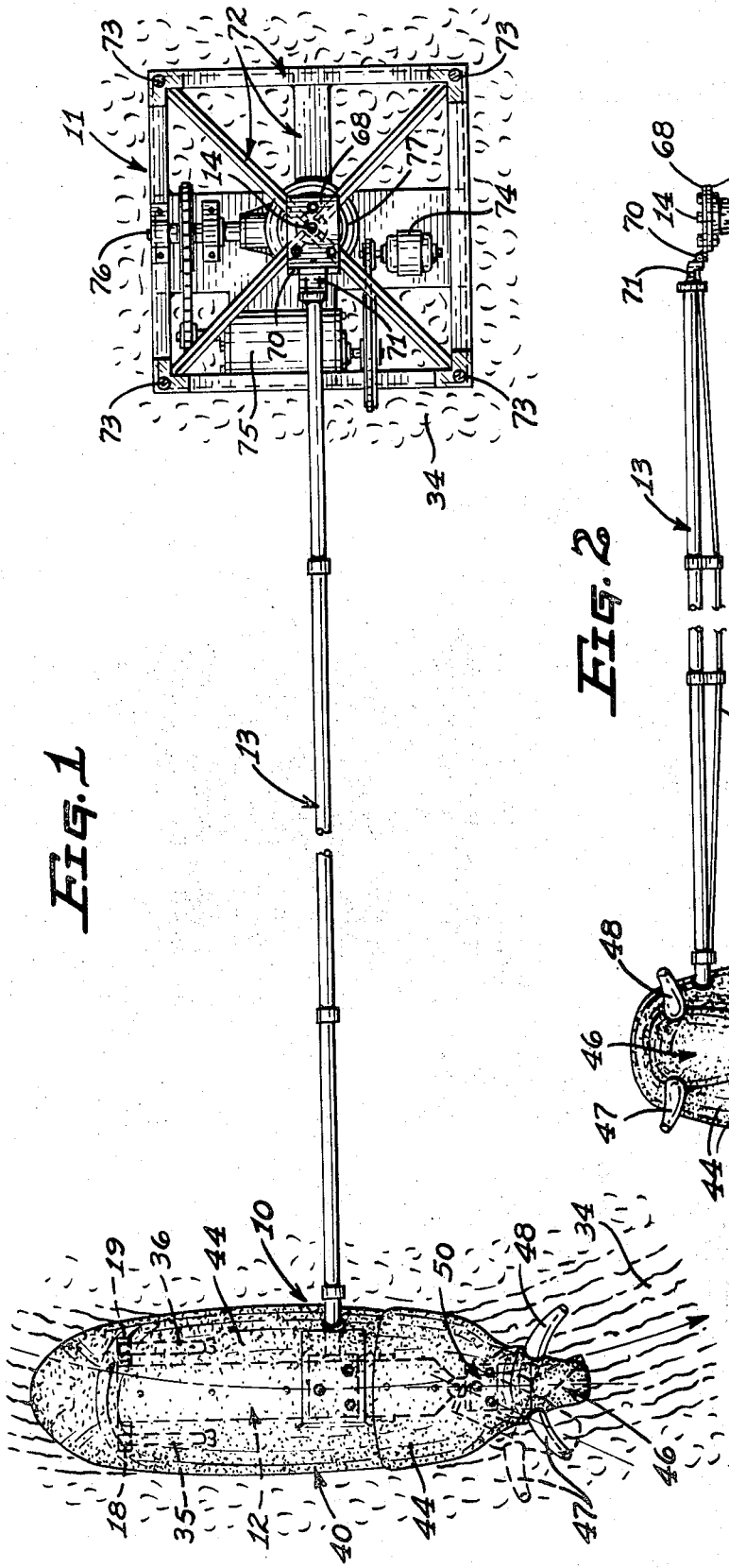
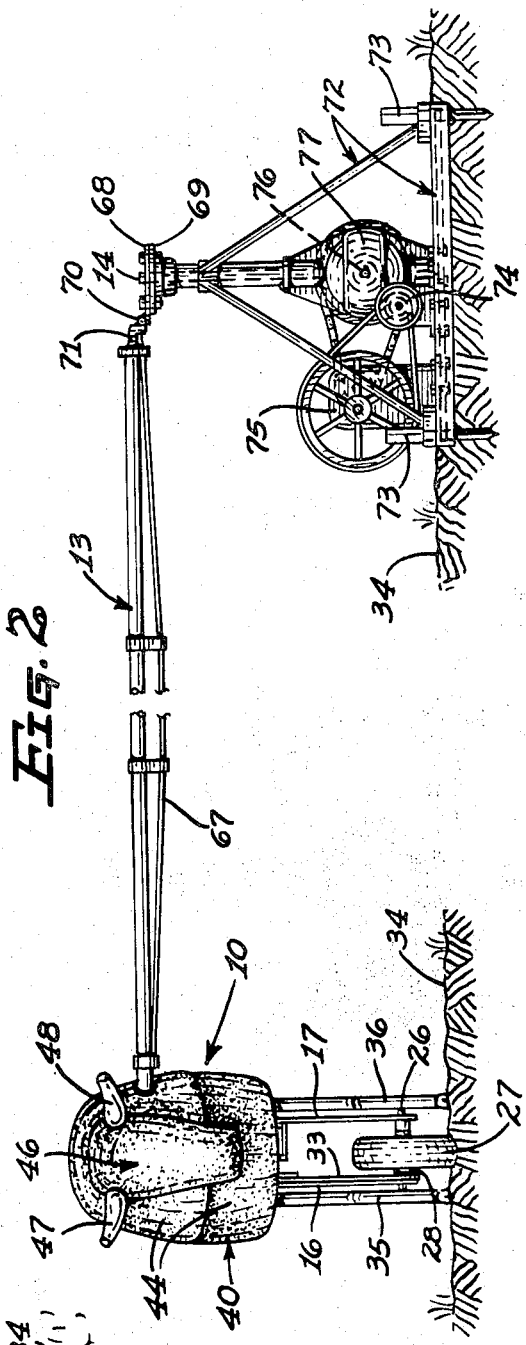
Fig.1
Fig.2

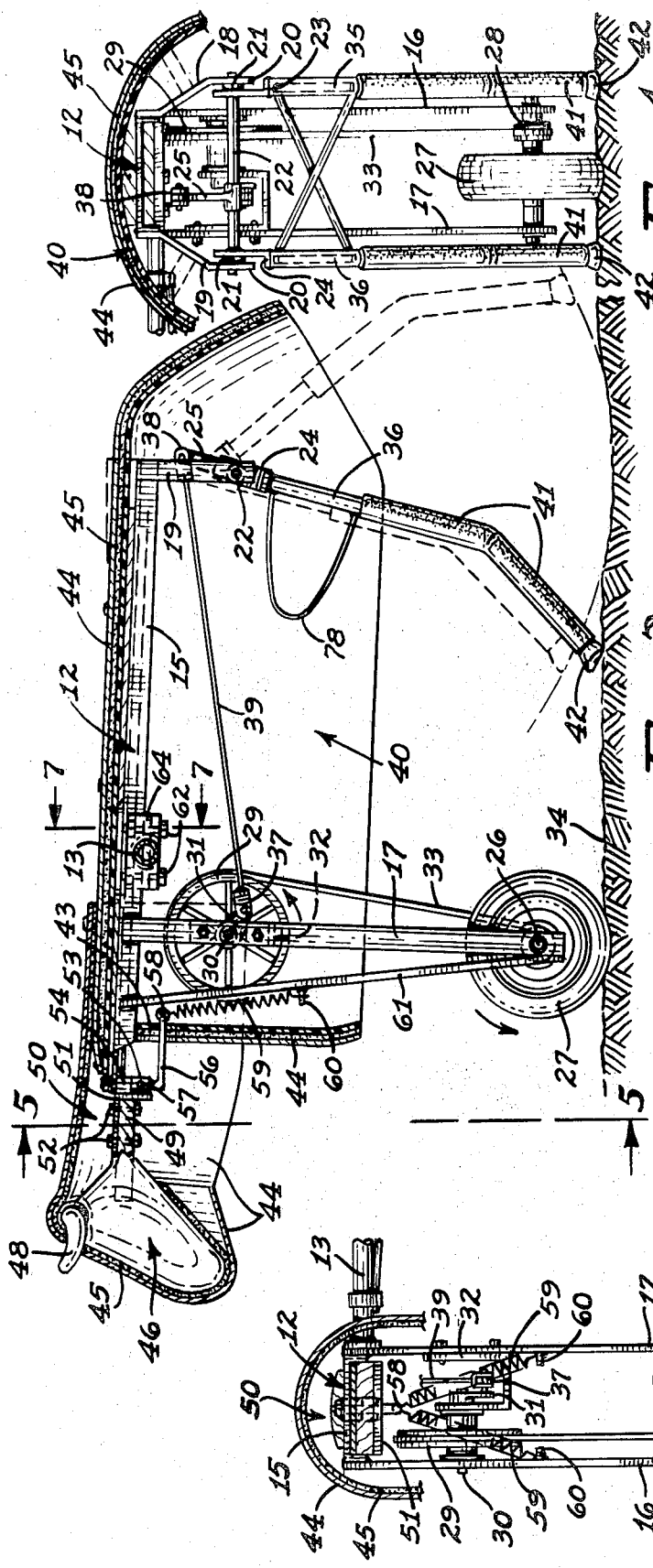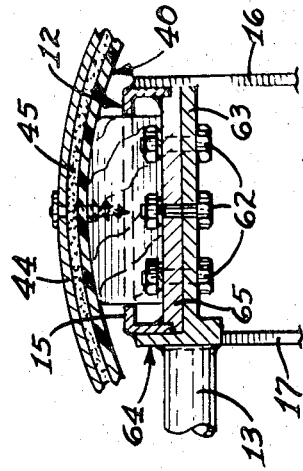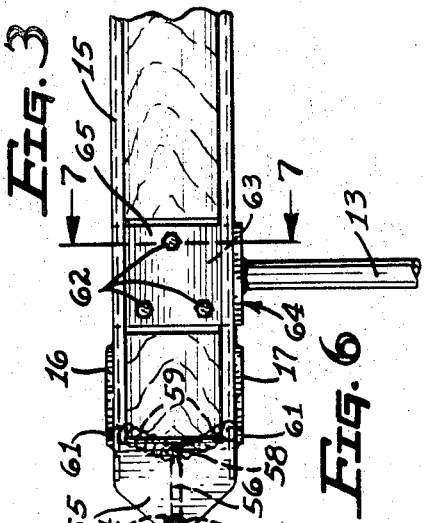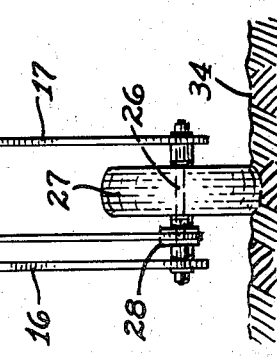

ANIMATED MECHANICAL STEER HAVING SPRING BIASED HEAD

BACKGROUND OF THE INVENTION

1. Field of the Invention

This invention is directed to a portable, animated mechanical steer and associated power means for causing it to move in a circular path and to animate life like movements of the steer.

2. Description of the Prior Art

Cattle roping or lassoing is a well known art which has been practiced for years for cattle handling and entertainment purposes. Both of these purposes require a continuing supply of individuals highly trained in the proper use of a lariot or lasso for roping moving animals from horseback. Further, horses used for these purposes need be trained to follow the moving animal at the proper speed and distance to allow the novice cowboy to become proficient in the art of cattle roping.

Heretofore, it has been difficult and expensive to provide live stock and trained horses for practice purposes. Accordingly, a need exists for a portable, animated, moving steer which can be quickly set up in a comparatively small area and utilized once or as many times as may be required for simulated cattle roping.

SUMMARY OF THE INVENTION

It is, therefore, an object of this invention to provide an inexpensive, portable, animated steer propelled around a circular path to provide simulated steer movement.

Another object of this invention is to provide a portable, animated steer which may be quickly and easily set up and operated to provide means for training and practice exerxises in cattle roping for cowboys and their mounts.

A further object of this invention is to provide an automatically operated, portable, animated device simulating a steer supported on a wheel which allows the simulated steer to be moved in a circular path over the undulated surface of the terrain upon which the device is installed.

A still further object of this invention is to provide a mechanically activated steer with animated hind legs and radially movable head, horns and neck portions to more closely simulate the movements of a live animal when moved and roped than heretofore possible.

Further objects and advantages of this invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a top plan view of the animated mechanical steer of this invention showing the attachment of the steer to its propulsion apparatus.

FIG. 2 is a front elevational view of the animated mechanical steer and propulsion apparatus shown in FIG. 1 illustrating the relationship of the steer's body and hind legs to the ground surface and one method of anchoring its propulsion apparatus to the same.

FIG. 3 is a left side elevational view of the animated mechanical steer shown in FIGS. 1 and 2 with parts in section and broken away to more clearly illustrate the simulated steer's frame or skeleton, its covering and movable components.

FIG. 4 is a rear elevational view of the steer's structure shown in FIG. 3.

FIG. 5 is a combination front elevational and sectional view of the steer's structure taken on the line 5—5 of FIG. 3.

FIG. 6 is a fragmentary plan view of the forward end of the steer's frame structure illustrating one method of pivotally connecting the head portion of the steer to the forward end of the frame and one method of removably attaching the propulsion means to the same.

FIG. 7 is a vertical sectional view taken on the line 7—7 of FIG. 6 further illustrating the method of attaching the propulsion means to the frame.

DESCRIPTION OF THE PREFERRED EMBODIMENT

Referring now to the various views of the drawings by characters of reference, FIG. 1 illustrates a mechanically animated steer 10 actuated by a propulsion device 11. Steer 10 comprises a rigid skeleton or frame assembly 12 to which is connected at one end a radially extending and substantially horizontally positioned tubular arm 13. The other end of arm 13 is connected to the top end of a rotatable vertical positioned shaft 14 of the propulsion device 11.

Frame 12 of steer 10 comprises a longitudinally extending channel member 15 which is provided near its front end with a pair of vertically depending spaced support bars 16 and 17 and at its rear end with a pair of vertically depending spaced support members 18 and 19. Each of the support members are rigidly secured to opposite sides of the channel member 15 with support members 18 and 19 angled outwardly from the sides of frame member 15. The bottom ends 20 of support members 18 and 19 are provided with bearings 21 which are adapted to support the ends of a transverse rock shaft 22 in rotative relation therein.

The rock shaft 22 is provided at each end adjacent the bearings 21 with a pair of opposed depending angle members 23 and 24 which are keyed or otherwise rigidly secured to rock shaft 22 so as to oscillate or move about the center of the shaft when the radially upwardly extending lever arm 25 also keyed to rock shaft 22 is oscillated.

The vertical depending support bars 16 and 17 are held in spaced parallel relationship to each other by means of a non-rotatable axle shaft 26 which is adapted to support in rotative relationship in suitable bearings, a rubber tired rotatable road wheel 27 and rotatable pulley 28. Pulley 28 is fixed to the hub of the road wheel between the side of the wheel and the inner face of the support bar 16, as shown in FIG. 5. The axle shaft 26 extends through aligned apertures in the lower end of the support bars 16 and 17 where it is removably secured by suitable washers and lock-nuts to the outer faces thereof.

Directly above, and in vertical alignment with pulley 28, is a larger pulley wheel 29 which is keyed to or otherwise secured on a rotatable stub shaft 30. Shaft 30 is journalled in suitable bearings on both sides of the pulley wheel with one end of the shaft extending through an aperture in the depending support bar 16 and the other end extending through an aperture in the vertical inner leg of a U-shaped support bracket 32. The vertical outer leg of the U-shaped support bracket 32 is secured to the inside face of the depending support bar 17, as shown. A crank arm or lever 31 is secured to the screw end of shaft 30 adjacent the inner vertical leg of the U-bracket 32 by means of a set sctrew. The outer end of the crank arm is provided with an aperture through which a pin extends to pivotally connect the outer end of the crank arm 31 to an adjustable clevis member 37. A tie-rod 39 extends rearwardly from clevis member 37 and is attached to the adjustable clevis member 38 pivotally connected to the outer end of lever arm 25. Lever arm 25 is fixed to rock shaft 22 as previously described.

The small pulley 26 which is adapted to rotate with road wheel 27 is connected to the large pulley wheel 29 in rotative relation by a V-belt 33. V-belt 33 drives the large pulley wheel in a counter-clockwise direction at a lower rate of speed than that imported to the small pulley 26 by the forward movement of road wheel 27 as it traverses the ground surface 34 when the animated steer 10 is propelled about a circular path by the propulsion device 11.

The lever 31 may be of any desirable length so as to impart to and fro arcuate movement to lever arm 25 and hence angle members 23 and 24. As described previously, angle members 23 and 24 support the tubular hind legs 35 and 36 of the steer as shown in FIGS. 3 and 4. To impact this arcuate to and fro or swinging motion to the steer's hind legs, the outer ends of the eccentric crank arm 31 and the lever arm 25 have been pivotally connected to each other by adjustable clevis members 37 and 38 and tie rod 39. When the mechanical steer is moved forward with the road wheel 27 contacting the ground surface 34, rotary motion is imparted to the large pulley wheel 29 and the eccentric crank arm 31. This action causes the crank arm to simultaneously impact an oscillating movement to lever arm 25 fixed to rock shaft 22 and hence to the steer's tubular hind legs 35 and 36 causing them to swing to and fro in an arcuate path about the center of rock-shaft 22 as indicated by dotted line in FIGS. 3. This action animates the steer's hind legs in a life-like manner as the steer is moved around a circular path.

The lower portion of the steer's tubular hind legs 35 and 36 that are visible below the bottom edge of the body portion 40 of steer 10 are covered with a textured material 41, such as vinyl or rubber. Simulated hoofs 42 are mounted on the hind legs 35 and 36 to present a more life-like appearance to the steer's body portion 40. These hoofs are preferably formed of durable and somewhat flexible fiberglass in the simulated shape of a live steer's hoofs. The steer's body portion 40 is open on the underside to allow free movement of the hind legs and access to the various mechanical parts and is provided with an opening 43 at its top front end through which channel frame member 15 projects.

The entire outer surfaces of the fiberglass body portion 40 of the steer, with the exception of the openings mentioned above, are covered with a suitable textured material, such as durable, short pile carpet 44. A resilient foam rubber backing 45 is cemented or otherwise secured to the fiberglass body portion to prevent undue damage to the body portion by continual contact of a lasso on the same during roping practice.

A head 46 of the animated mechanical steer is also preferably formed of fiberglass and a pair of horns 47 and 48 attached thereto may be natural or simulated and are secured in the fiberglass head in any suitable manner. The rear end of the head portion 46 is cemented or otherwise secured to a wood block 49 which projects from within the hollow head, rearwardly to form the neck portion 50 of the steer. A metal angle plate 51 is secured by bolts and nuts 52 to the top of the wood block 49 with its short depending leg abutting the rear edge of the block. The lower portion 53 of a hinge member is rigidly secured to the depending leg of plate 51. The upper portion 54 of the hinge member is secured to the reinforced forward projecting end 55 of the channel frame member 15 as shown in FIGS. 3 and 6.

The upper and lower hinge portions 54 and 53 are each provided with vertically aligned bores which are adapted to receive the vertical portion of an L-shaped pivot rod 56, the upper end of which is threaded and projects through an aperture in the forward end 55 of the channel frame 15 where it is secured by a washer and nut in pivoted relation to the projecting end of the frame. The lower portion 53 of the hinge member is secured in non-rotative relation to the vertical portion of the L-shaped pivot rod by means of a set screw 57. The horizontal portion of the L-shaped pivot rod 56 extends rearwardly through the opening 43 in the fiberglass body 40 and is provided at its rear end with an integral eye 58. Eye 58 is adapted to receive the upper ends of a pair of biased tension springs 59 which extend downwardly and outwardly and their bottom ends are each hooked onto a pair of inwardly extending lugs 60 which are secured to the inside edges of a pair of support members 61. These support members are welded to the sides of the channel frame 15 and to the front edges of the depending support bars 16 and 17.

The mechanical arrangement described above allows the head and neck portions of the animated steer to be pivoted in an arc about the center of the upper portion 54 of the hinge welded to the end of frame 15. This structure provides rotational movement of the horizontal leg portion of the L-shaped pivot rod about the center of the upper portion 54 causing one of the biased springs 59 to be placed under tension and the other to be relieved of tension, depending on the direction which the head and neck portion are rotated. For instance, when practicing roping, only one horn may be caught in the noose of the lasso causing the head to be turned to one side by the resultant pull on the lasso. This action causes the noose of the rope to slip off the horn as it would when roping a live steer which has a natural inclination to turn its head to prevent being roped. After the noose is removed from the horn, the mechanical steer's head and neck portions will automatically return to their normal straight ahead position by the action of the biased springs 59 on the L-shaped pivot rod 56.

The head, neck and shoulder portions of the steer are covered with the same short pile padded carpet or other material 44 as covers the body portion 40. This portion of the steer is open at the bottom and left substantially loose where it covers the neck and shoulder portions so as not to interfere with the radial movement of the head and neck.

The animated mechanical steer of this invention is propelled around a circular path by means of the radially extending arm 13. Arm 13 is rigidly attached to the underside of frame 15 by at least three bolts 62 which pass through clearance holes in the horizontal plate portion of an angled plate extension 64. Plate extension 64 is welded securely to one end of arm 13 with the vertical leg of the extension abutting the side of frame 15. Bolts 62 extend upwardly through clearance holes in a mating horizontal plate 65 which is permanently welded in transverse relationship to the legs of channel frame 15 where they are removably secured by suitable lock washers and nuts 66.

The radially extending arm 13 may be reinforced by a suitable tie-rod 67, if so desired, and is secured at its inner end to the rotatable, vertical shaft 14 of the propulsion device by means of bolts which secure its horizontal extension plate 68 to a mating plate 69. Plate 69 is keyed to the rotatable shaft 14 so that plate 68 rotates with shaft 14. Plate 68 is hinged at 70 to an angle extension 71 which in turn is welded or otherwise secured to the end of arm 13 so as to provide for vertical up and down movement of the steer as it transverses the ground in a circular path.

The propulsion device 11 comprises generally a square or other shaped frame member 72 which is preferably constructed of metal having legs which project into the surface of ground 34 upon which the device is installed. A plurality of drive pins or stakes 73 are driven through holes in the corners of the frame 72 to stabilize and prevent transverse or vertical angular movement of the device on the ground surface.

The propulsion device 11 includes an electric drive motor 74 connected to a suitable source of power through an underground line (not shown). A V-belt drives a reduction gear train in housing 75 which through a chain drive is adapted to drive a gear attached to a horizontal propeller shaft 76. Shaft 76 drives the usual pinion and ring gear enclosed in housing 77 which transfers the horizontal rotary movement to the rotatable vertical shaft 14 to arm 13 causing the mechanical steer to be propelled while supported on its road wheel 27 along the ground surface 34 about a circular path and at a controlled speed.

It should be noted that when the animated steer 10 is at rest with road wheel 27 and hoofs 42 of the hind legs 35 and 37 contacting the ground surface 34, the channel frame member 15 and hence the steer's back is on a slight downward angle to its rear. This structure restricts the desired oscillating movement of the steer's hind legs and impose a slight torque to the radially extending arm 13 to which the steer's skeleton 12 is attached, but when forward movement is impacted to the steer by the rotating arm 13, the force of such applied forward thrust causes frame 15 to assume a horizontal position thereby lifting the hind legs and hoofs 42 of the steer above the ground surface. This action permits a swinging movement of the hind legs of the steer without restriction preventing possible entanglement of the noose of a lasso with the mechanism. Each of the legs 35 and 36 are provided with a forwardly extending loop member 78 which is wleded to the tubular, uncovered portion of the legs restricting the rope thrown around the hind legs of the animal from moving up into its leg actuating mechanism.

Although but one embodiment of this invention has been illustrated and described, it will be apparent to those skilled in the art that various changes and modifications may be made therein without departing from the spirit of the invention or from the scope of the appended claims.

What is claimed is:

1. A device animating a steer comprising:
   a pedestal,
   an arm rotatively mounted on said pedestal,
   means at the free end of said arm for attaching an animated steer to said arm,
   said steer comprising a frame, a head pivotally mounted on one end of said frame, a pair of front legs having a wheel rotatably mounted therebetween and resting on the ground, and a pair of back legs for moving over the ground, and
   means mounted in said pedestal for moving said arm around in a circular path causing said steer to move over the ground in a manner simulating a live steer,
   said head comprising a pair of horns mounted to simulate a steer, and a pair of springs spacedly mounted on said frame to hold said head in a vertical position, one of said springs compressing when said head is pivotally moved by a rope to one side, said springs returning said head to its vertical position when released from said rope,
   said head when lassoed by a rope moving in an arcuate manner to attempt to dislodge the rope in a live steer simulated manner.

2. The device set forth in claim 1 in further combination with:
   drive means connected to said wheel for pivotally moving said back legs upon rotation of said wheel.

3. The device set forth in claim 2 wherein:
   said back legs oscillate in an arcuate path longitudinal of said frame to simulate the movement of the back legs of a steer.

4. The device set forth in claim 1 wherein:
   said head is pivotally mounted to oscillate about the longitudinal axis of said frame, and
   means for spacedly mounting said pair of springs one on each side of said axis for biasing said head to a vertical position longitudinal of said frame.

5. The device set forth in claim 1 wherein:
   said means for moving said arm around in a circular path comprises an electric motor in said pedestal geared to rotate said arm about said pedestal.

6. The device set forth in claim 1 wherein:
   said frame is covered with a rug simulating a steer's body.

* * * * *